(12) United States Patent
Esposito et al.

(10) Patent No.: US 10,739,378 B2
(45) Date of Patent: Aug. 11, 2020

(54) NON-LOCAL SCANNING PROBES FOR SCANNING PROBE MICROSCOPY

(71) Applicant: The Trustees of Columbia University in the City of New York, New York, NY (US)

(72) Inventors: Daniel Vincent Esposito, New York, NY (US); Glen O'Neil, Montclair, NJ (US); John Wright, New York, NY (US); Han-wen Kuo, New York, NY (US); Anna E. Dorfi, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/393,367

(22) Filed: Apr. 24, 2019

(65) Prior Publication Data
US 2019/0324055 A1    Oct. 24, 2019

Related U.S. Application Data

(60) Provisional application No. 62/661,823, filed on Apr. 24, 2018, provisional application No. 62/837,243, filed on Apr. 23, 2019.

(51) Int. Cl.
*G01Q 60/60* (2010.01)
*G01Q 30/20* (2010.01)

(52) U.S. Cl.
CPC ............ *G01Q 60/60* (2013.01); *G01Q 30/20* (2013.01)

(58) Field of Classification Search
USPC ......................................................... 850/51
See application file for complete search history.

(56) References Cited

U.S. PATENT DOCUMENTS

| 5,729,026 A | * | 3/1998 | Mamin | B82Y 35/00 |
| | | | | 250/492.2 |
| 5,856,672 A | * | 1/1999 | Ried | G11B 9/1418 |
| | | | | 250/423 F |

* cited by examiner

*Primary Examiner* — Kiet T Nguyen
(74) *Attorney, Agent, or Firm* — Murtha Cullina LLP; Anthony P. Gangemi

(57) ABSTRACT

The system is configured for performing scanning electrochemical microscopy via non-local continuous line probes. The continuous line probes include an insulating probe substrate, an insulating layer, and a conductive band electrode. The system includes a sample stage for positioning a sample substrate to be imaged so as to enable contact with the insulting probe substrate at an angle $\Theta_{CLP}$. The continuous line probe is translated across the sample substrate and changes in the signal generated at the continuous line probe are identified to indicate the presence of features on the sample substrate. A plurality of scans are performed at different angles via rotating the sample stage or the continuous line probe, the results of which are combined and analyzed to produce an image of the sample substrate via compressed sensing reconstruction. The resulting image has comparable resolution to those produced via conventional scanning electrochemical microscopy processes, but in less scan time and with less complex scanning hardware.

15 Claims, 11 Drawing Sheets

NON-LOCAL SCANNING PROBES FOR SCANNING PROBE MICROSCOPY

CROSS REFERENCE TO RELATED APPLICATION(S)

This application claims the benefit of U.S. Provisional Patent Application Nos. 62/837,243, filed Apr. 23, 2019, and 62/661,823, filed Apr. 24, 2018, which are incorporated by reference as if disclosed herein in their entirety.

BACKGROUND

Scanning electrochemical microscopy (SECM) is a powerful scanning probe microscopy (SPM) imaging method used for evaluating the chemical and physical properties of materials at microscopic and nanoscopic length scales. The vast majority of SECM measurements performed to date have used conventional ultramicroelectrode (UME) probes, which typically consist of a metallic wire sealed in an insulating glass sheath. During operation, the electrochemical interaction between this UME "point probe" and the sample are recorded in a point-by-point sensing scheme as the UME is scanned across an area of interest. A major shortcoming of conventional point probes is that they require very long scan times to image large sample areas with high resolution. In general, long scan times result in low throughput and can lead to unwanted changes in the sample or probe.

Previous research efforts have attempted to overcome the trade-off between resolution and areal imaging rates through a variety of approaches that have involved modifications to SECM hardware, the use of advanced probe geometries, and/or post measurement image processing to correct for blurriness and artifacts associated with fast scan speeds. For example, the development of scanning droplet cells for scanning electrochemical cell microscopy (SECCM), combined with the use of more efficient spiral scan patterns, has resulted in substantial increases in areal imaging rates thanks to their ability to utilize high scan rates without being limited by convection. Alongside instrument development, the use of innovative probe configurations and geometries has emerged as a promising approach to increase SECM imaging rates. For example, multiple studies have demonstrated the use of individually addressable sub micrometer electrodes for large area imaging. Other previous research combined the idea of using a linear array of microelectrodes with polymeric thin films to create soft, flexible probes capable of imaging large sample areas, even for tilted and curved surfaces. Yet, the resolution of these probes remains limited by the lateral spacing between the point probes embedded within the array. Additionally, fabrication of these probes is nontrivial, and more complex electronics (e.g. multiplexer or multichannel potentiostat) are required to analyze the signals from the individually addressable electroactive elements.

In chemical microscopy, various image post-processing strategies have been introduced for producing high-quality images from undersampled datasets. Understanding the number of measurements to reconstruct a continuous signal is also a concern in signal processing. For example, the classical Shannon-Nyquist theorem dictates the resolution of point sampling required to accurately construct a bandlimited image. While this result plays a role in areas ranging from RF communications to audio processing, for imaging it may be suboptimal: real images are not just bandlimited—they may possess additional structure, which, if used appropriately, can reduce the number of measurements required for accurate imaging. For example, in chemical microscopy, a sample of interest may include relatively sparse electrocatalytic features. The number of such features is one measure of the "information content" of the image, and is typically much smaller than the number of image pixels.

SUMMARY

Some embodiments of the present disclosure are directed to a system for performing scanning electrochemical microscopy that includes a continuous line probe including an insulating probe substrate, an insulating layer, and a conductive band electrode disposed between the insulating probe substrate and the insulating layer. In some embodiments, the conductive band electrode has a thickness between about 10 μm and about 100 μm. In some embodiments, the conductive band electrode has a thickness less than about 50 μm. In some embodiments, the insulating probe substrate has a thickness between about 50 μm to about 70 μm. In some embodiments, the insulating probe substrate and the electrode layer have substantially the same thickness. In some embodiments, the system includes an additional point probe.

In some embodiments, a sample stage is positioned to enable contact with the insulating probe substrate, namely at an angle $\Theta_{CLP}$ to the sample stage. In some embodiments, $\Theta_{CLP}$ is about 450. In some embodiments, the sample stage includes a rotational module configured to rotate the sample stage about one or more rotational axis and an XYZ module configured to translate the sample stage along one or more planar axis.

Some embodiments of the present disclosure are directed to a method of performing scanning electrochemical microscopy including providing a scanning electrochemical microscopy positioning a sample substrate to be imaged on the sample stage. In some embodiments, the method includes positioning a continuous line probe at an angle to a sample substrate and at an initial position relative to the sample substrate, wherein an at least one insulating sheet in the continuous line probe is in contact with the sample substrate. In some embodiments, the method includes applying an electrical potential to the continuous line probe. In some embodiments, the method includes applying an electrical potential to the sample substrate. In some embodiments, the method includes translating the continuous line probe across a first portion of the sample substrate along an initial axis. In some embodiments, the method includes repositioning the continuous line probe via at least one of a rotational module and a XYZ module at one or more additional positions relative to the sample substrate. In some embodiments, the method includes translating the continuous line probe across an additional portion of the sample substrate along one or more additional axis, wherein the one or more additional axis are at an angle to the initial axis. In some embodiments, the method includes identifying changes in continuous line probe current along the initial axis and the one or more additional axis indicating the presence of a feature on the sample substrate. In some embodiments, the method includes reconstructing an image of the sample substrate corresponding to at least the changes in continuous line probe current along the initial axis and the one or more additional axis via compressed sensing reconstruction.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
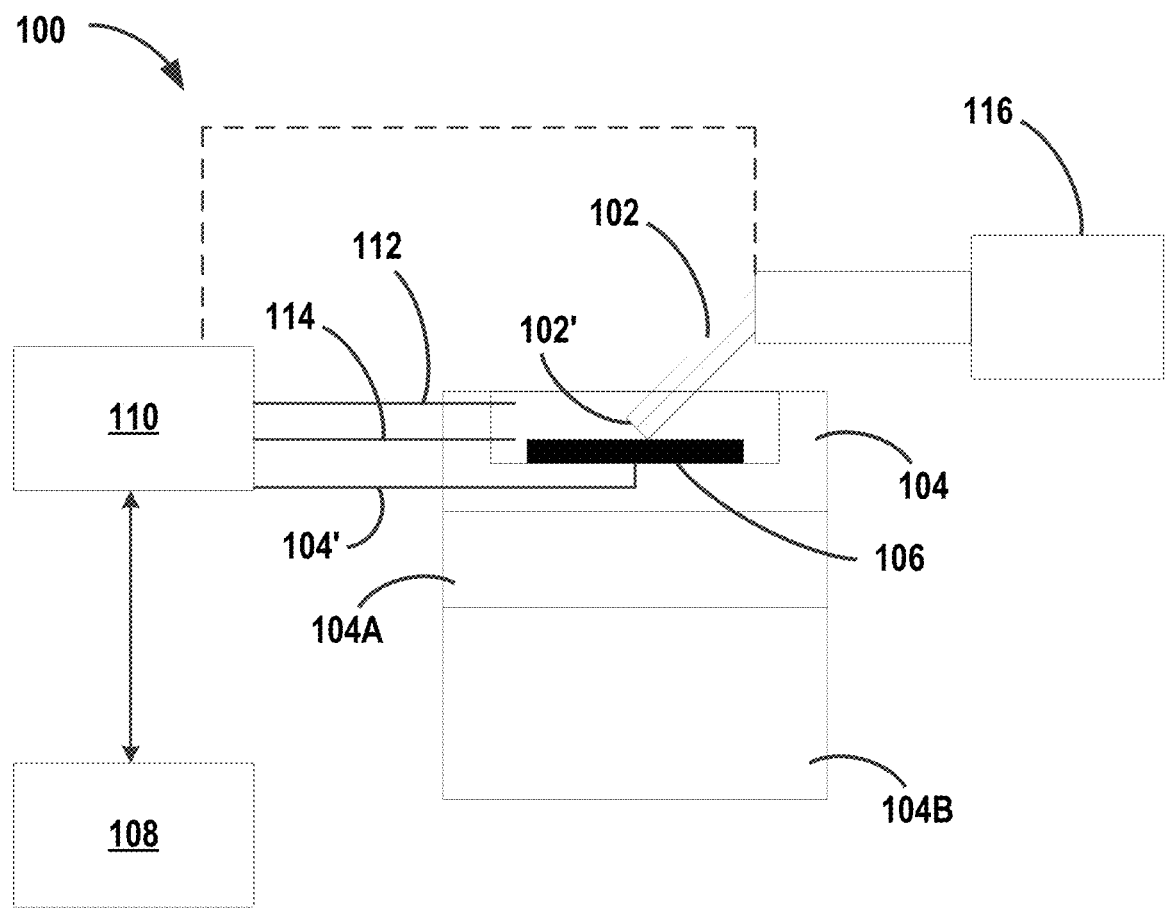
FIG. 1 is a schematic drawing of a system for performing scanning electrochemical microscopy according to some embodiments of the present disclosure.

Referring now to FIG. 1, aspects of the disclosed subject matter include a system 100 for performing scanning electrochemical microscopy (SECM). In some embodiments, system 100 includes one or more continuous line probes 102 and a sample stage 104. Continuous line probes 102 are configured to perform scanning electrochemical microscopy on a sample substrate 106 provided on sample stage 104 for producing an image of the sample substrate, as will be discussed in greater detail below.

Figure 2A:
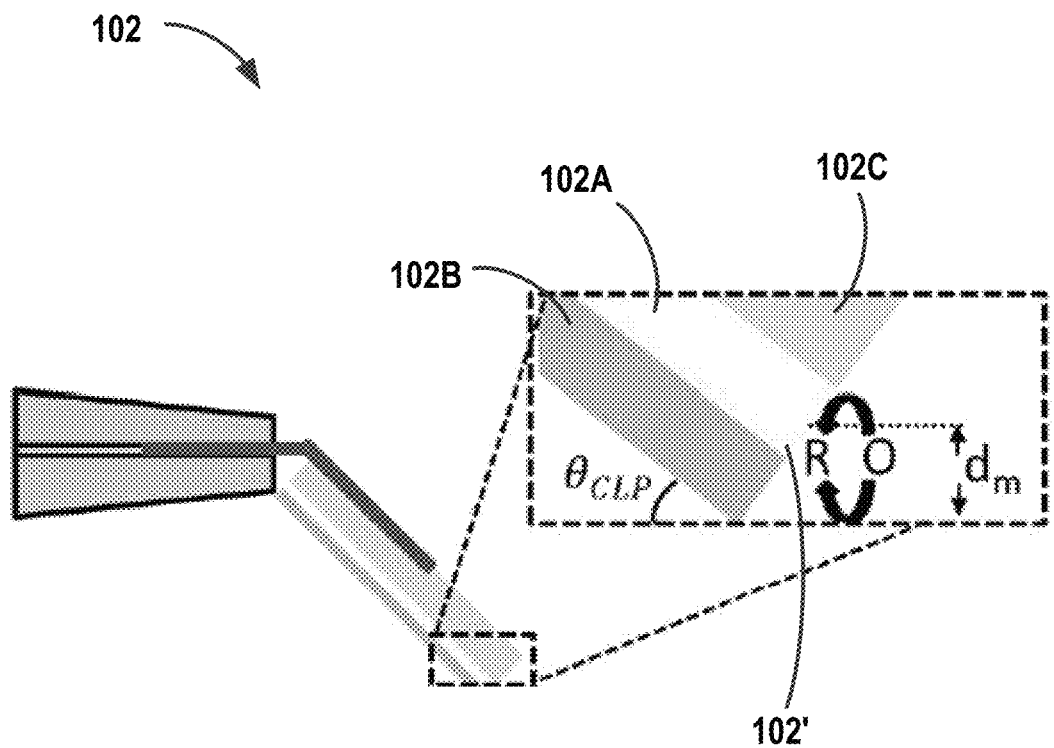
FIG. 2A is a schematic drawing of a continuous line probe according to some embodiments of the present disclosure.
Figure 2B:
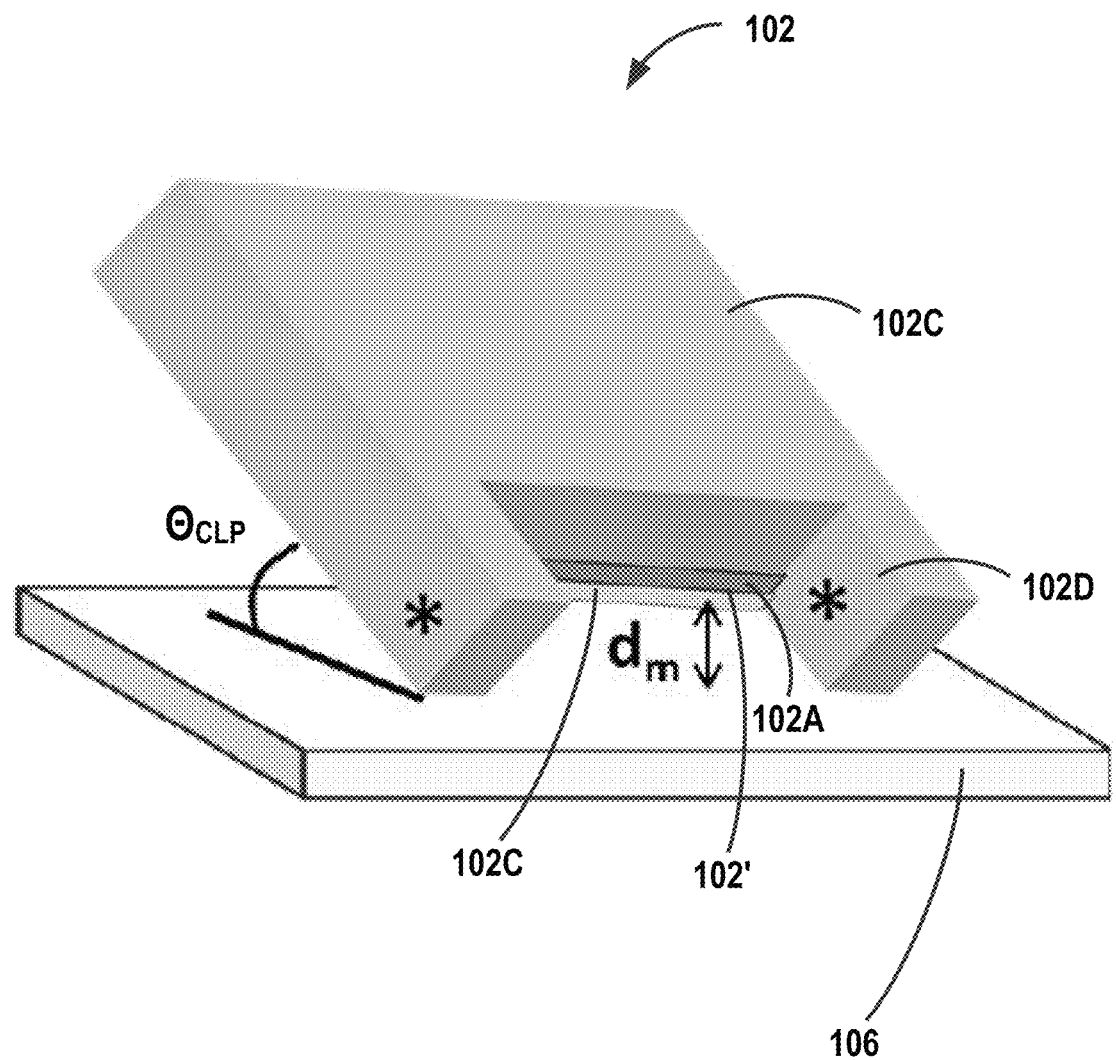
FIG. 2B is a schematic drawing of a continuous line probe according to some embodiments of the present disclosure.

Referring now to FIG. 2A, in some embodiments, continuous line probe 102 includes an electrode layer 102A. In some embodiments, electrode layer 102A is a conductive band electrode. In some embodiments, the width of conductive band electrode 102A is significantly greater than the thickness of the electrode. In some embodiments, conductive band electrode 102A is composed of one or more suitable conductive materials for making amperometric measurements of sample substrate 106, e.g., platinum. In some embodiments, conductive band electrode 102A is disposed on an insulating probe substrate 102B. In some embodiments, conductive band electrode 102A is disposed between insulating probe substrate 102B and a further insulating layer 102C. In some embodiments, continuous line probe 102 includes a plurality of conductive band electrodes 102A. In some embodiments, the plurality of conductive band electrodes 102A are separated by insulating layers 102C. In some embodiments, sensing surface 102' of continuous line probe 102 is substantially planar. Referring now to FIG. 2B, in some embodiments, continuous line probe 102 includes one or more legs 102D extending beyond sensing surface 102'.

Referring again to FIG. 1, continuous line probes 102 and a sample stage 104 are configured to bring sensing surface 102' in close proximity with sample substrate 106 disposed on the stage. In some embodiments, continuous line probes 102 and a sample stage 104 are configured to bring insulating probe substrate 102B into contact with sample substrate 106. In some embodiments, continuous line probes 102 and a sample stage 104 are configured to bring legs 102D into contact with sample substrate 106. Referring again to FIGS. 2A and 2B, in some embodiments, the average separation distance $d_m$ between conductive band electrode 102A and sample substrate 106 during imaging is defined by Equation 1:

$$d_m = \left(\frac{t_E}{2} + t_I\right)\sin(90° - \Theta_{CLP}) \quad \text{Equation 1}$$

wherein $t_E$ is the thickness of conductive band electrode 102A, $t_I$ is the thickness of insulating probe substrate 102B, and $\Theta_{CLP}$ is the angle of continuous line probe 102 to sample substrate 106. In some embodiments, conductive band electrode 102A is sized to provide positive/negative feedback to be observed during SECM imaging. In some embodiments, $d_m$ is between about 30 μm to about 90 μm. In some embodiments, $d_m$ is between about 50 μm to about 70 μm. In some embodiments, the thickness of conductive band electrode 102A is between about 0.1 μm and about 1 μm. In some embodiments, the thickness of conductive band electrode 102A is between about 1 μm and about 10 μm. In some embodiments, the thickness of conductive band electrode 102A is between about 10 μm and about 100 μm. In some embodiments, the thickness of conductive band electrode 102A is less than about 50 μm. In some embodiments, the thickness of insulating probe substrate 102B is between about 50 μm to about 70 μm. In some embodiments, insulating probe substrate 102B and conductive band electrode 102A have substantially the same thickness. In some embodiments, the angle of continuous line probe 102 to sample substrate 106 ($\Theta_{CLP}$) is between about 40° to about 50°. In some embodiments, $\Theta_{CLP}$ is about 450. In some embodiments, the insulting layers of continuous line probe 102, e.g., insulating probe substrate 102B and insulating layer 102C, are made from one or more insulating polymeric materials, e.g., polycarbonate, polyimide, etc.

Referring again to FIG. 1, in some embodiments, sample stage 104 includes a rotational module 104A configured to rotate the sample stage about one or more rotational axis. In some embodiments, sample stage 104 includes an XYZ module 104B configured to translate the sample stage along one or more planar axis. Rotational module 104A and/or XYZ module 104B are configured to spatially position sample substrate 106 for imaging by continuous line probe 102, as will be discussed in greater detail below.

In some embodiments, continuous line probe 102 is in communication with a computing device 108 for recording amperometric measurements from a scan of continuous line probe 102 across sample substrate 106 and outputting the results from the scan, as will be discussed in greater detail below. In some embodiments, system 100 includes an additional point probe (not pictured) for enabling higher resolution scanning and imaging of sample substrate 106. In some embodiments, system 100 includes a potentiostat 110 in communication with continuous line probe 102, sample stage 104, or combinations thereof. In some embodiments, system 100 includes a reference electrode 112 and a counter electrode 114. In some embodiments, sample stage 104 includes a working electrode 104'. Potentiostat 110 is configured to provide electrical potential to continuous line probe 102, sample stage 104, sample substrate 106, reference electrode 112, counter electrode 114, working electrode 104', or combinations thereof. In some embodiments, sample stage 104 further includes one or more electrolytes in fluid communication with sample substrate 106. In some embodiments, system 100 includes a continuous line probe translation module 116 positioned and configured to translate and rotate continuous line probe 102 independently of sample stage 104.

Figure 3:
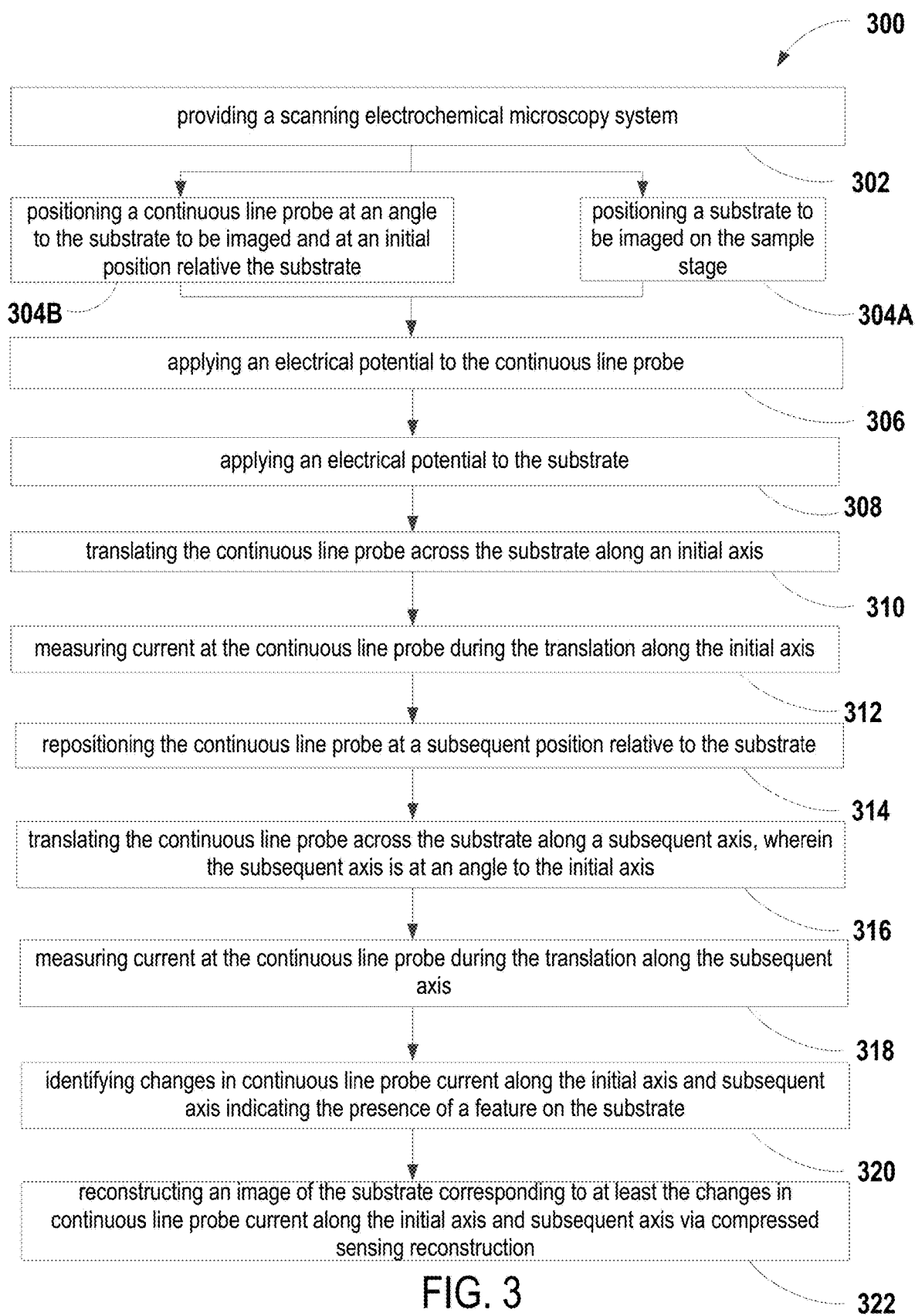
FIG. 3 is a chart of a method for performing scanning electrochemical microscopy according to some embodiments of the present disclosure.

Referring now to FIG. 3, some embodiments of the present disclosure are directed to a method 300 for performing scanning electrochemical microscopy. At 302, a scanning electrochemical microscopy system is provided. In some embodiments, the scanning electrochemical microscopy system is consistent with the embodiments of system 100 described above and include one or continuous line probes. In some embodiments, the probe is preconditioned to "clean" the probe and/or sample substrate surface by oxidizing organic matter that may be present and clearing the surface of any remaining reactant species from previous scans. The preconditioning step is effective to maintain a consistent background signal for subsequent scans. At 304A, a sample substrate to be imaged is positioned on a sample stage. At 304B, the continuous line probe is positioned at an angle to the sample substrate to be imaged and at an initial position relative the substrate. In some embodiments, the insulating probe substrate is in contact with the sample substrate to be imaged. At 306, an electrical potential is applied to the continuous line probe. At 308, an electrical potential is applied to the sample substrate.

At 310, the continuous line probe is translated across the sample substrate along an initial axis. In some embodiments, translation 310, i.e., each "scan," is greater than about 3 minutes, 5 minutes, 10 minutes, 20 minutes, etc. In some embodiments, the continuous line probe is held in contact with the sample substrate prior to translating the continuous line probe across the substrate along the initial axis. In some embodiments, the hold has a duration greater than about 3 minutes. At 312, current at the continuous line probe is measured during the translation 308 along the initial axis. At 314, the continuous line probe is then repositioned at a subsequent position relative to the sample substrate. As discussed above, in some embodiments, the continuous line probe is repositioned by repositioning the sample stage and/or the probe itself via at least one of the rotational module and the XYZ module. At 316, the continuous line probe is then translated across the sample substrate along a subsequent axis, wherein the subsequent axis is at an angle to the initial axis. At 318, current at the continuous line probe is measured during the translation 314 along the subsequent axis. Without wishing to be bound by theory, as more and more scans of the sample substrate are performed, additional data is available for use in the reconstruction of an image of the sample substrate. Thus, image resolution of the sample substrate increases as more scans are performed. In some embodiments, the sample substrate is scanned two or more times. In some embodiments, the sample substrate is scanned three or more times, e.g., steps 312-318 are repeated at least once. In some embodiments, at least a portion of the sample substrate is scanned during each of the scans performed in steps 310 and 316.

Figure 4:
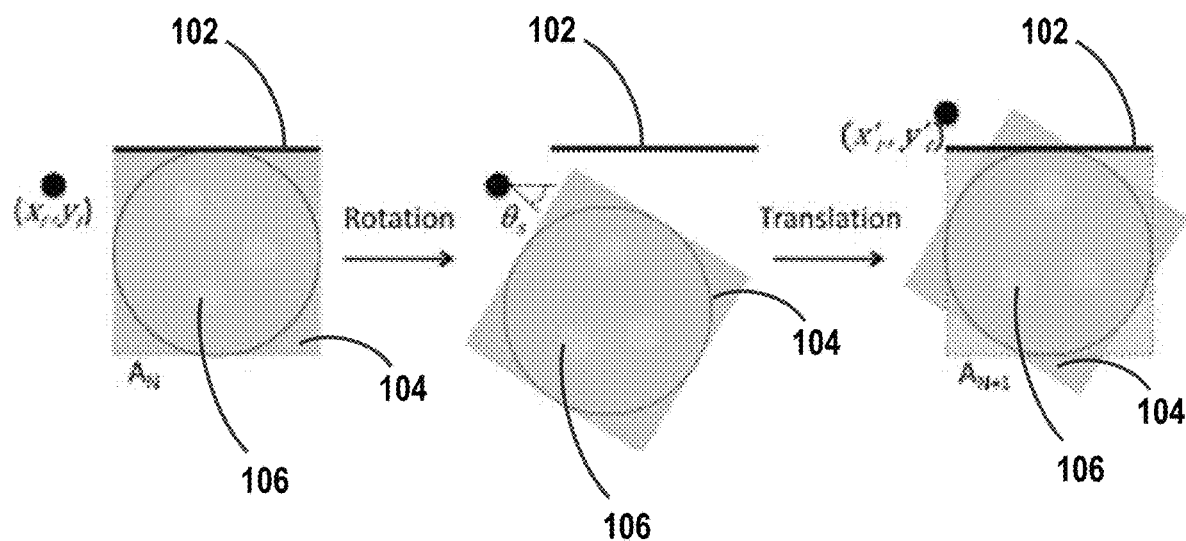
FIG. 4 is a graphical representation of a process for performing scanning electrochemical microscopy according to some embodiments of the present disclosure.

Referring now to FIG. 4, in some embodiments, once a scanned along a given axis, e.g., initial axis, subsequent axis, etc., the continuous line probe is repositioned relative to the substrate at a new angle $\Theta_s$. In some embodiments, once the sample substrate is rotated by the angle $\Theta_s$ with respect to the rotational center $(x_r, y_r)$ along the X translational direction, the stage is then translated in the X-Y plane. For every substrate position (x,y), its newly translated position T(x,y) is calculated by assigning the location of the rotational center $(x_r, y_r)$ of the stage and its rotational angle $\Theta_s$ at the current scan, using the following Equation 2:

$$T(x, y) = \begin{pmatrix} \cos\theta_s - 1 & \sin\theta_s \\ -\sin\theta_s & \cos\theta_s - 1 \end{pmatrix} \begin{pmatrix} x_r \\ y_r \end{pmatrix} + \begin{pmatrix} x \\ y \end{pmatrix} \qquad \text{(Equation 2)}$$

In some embodiments, the sample substrate is relocated back to the scanning area $A_{N+1}$, which is substantially the same as the initial scanning area $A_1$. In this way, a series of SECM scans can be performed without the need to position the rotational center of the stage at the exact center of the substrate.

Figure 5:
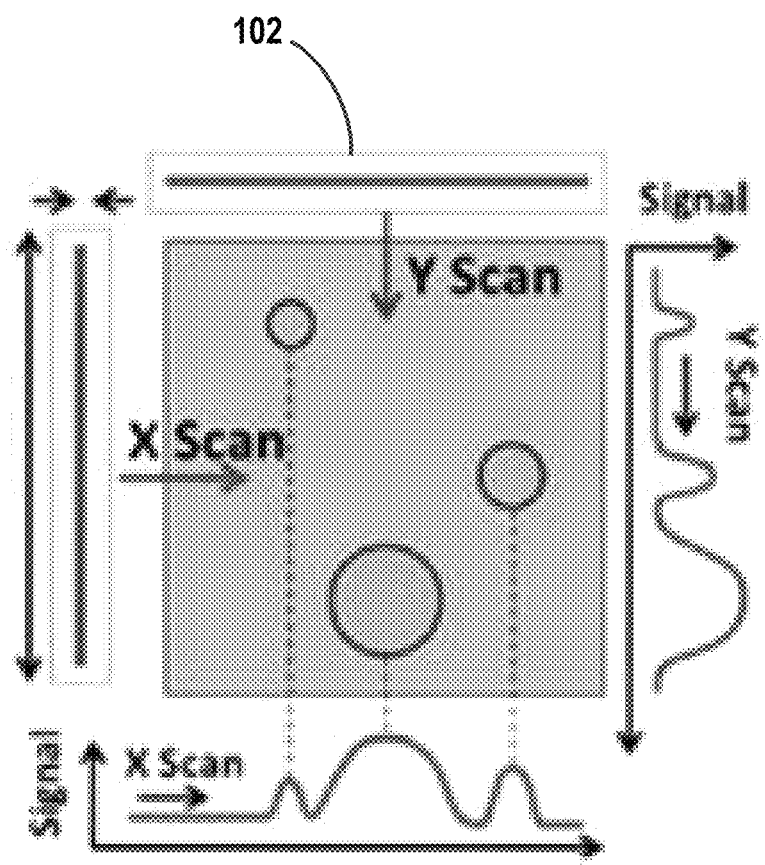
FIG. 5 is a graph of exemplary continuous line probe line scans according to some embodiments of the present disclosure.

Referring again to FIG. 3, at 320, changes in continuous line probe current are identified along the initial axis and subsequent axis indicating the presence of a feature on the sample substrate. Referring now to FIG. 5, and as would be understood by those having skill in the art, the amperometric response of the continuous line probe is measured as a function of distance (or time, or combinations thereof). The scan results in one or more distinct peak shapes. By analyzing the locations and shapes of the peaks identified in the amperometric measurements across one or more scans, the location, size, and electrocatalytic activity of features on or in the sample substrate can be determined.

Referring again to FIG. 3, at 322, an image of the sample substrate corresponding to at least the changes in continuous line probe current along the initial axis and subsequent axis is reconstructed via compressed sensing reconstruction. Without wishing to be bound by theory, compressed sensing reconstruction can accurately reconstruct images from a number of measurements that is proportional to the information content of the image. In the instant case, the system of the present disclosure can reconstruct an image from a small number of non-local measurements, namely the amperometric measurements taken by non-local continuous line probe such as those from the embodiments discussed above. The image is reconstructed by searching for the simplest (sparsest) image that is consistent with the measurements recorded by the continuous line probe. As few as two or three line scans are sufficient to reconstruct an image of a substrate having well-separated (sparse) features.

In some embodiments, system 100 includes a compressed sensing reconstruction algorithm. In some embodiments, the compressed sensing reconstruction algorithm includes a dictionary element D that is generated as the convolution of two terms show in Equation 3: i.) a 2D map of the uniform intrinsic electrocatalytic activity of the disc electrode, Disc[r], and ii.) a 2D Gaussian kernel, K[s]:

$$D = \text{Disc}[r] * K[s] \qquad \text{(Equation 3)}$$

wherein * is a 2D convolution operator. In Cartesian coordinates, Disc[r] is a function of two variables (x,y). The function value Disc(x,y) has an intensity equal to one whenever x2+y2<r2, and an intensity of zero otherwise. The Gaussian K[s] depends on the variance, s, and is given by the following Equation 4:

$$K[s](x, y) = \frac{1}{2\pi s^2} \cdot e^{\left(-\frac{x^2+y^2}{2 \cdot s^2}\right)}.$$ (Equation 4)

Here K[s] is effectively a point spread function that describes the response of the continuous line probe to a point source signal and depends on the geometry of the continuous line probe ($t_E$, $d_m$) and scanning conditions (redox couple, imaging mode, etc.). In some embodiments, a dictionary element D was generated for the investigated substrate features by first generating Disc[r] based on known substrate features and assigning a value of s to the kernel.

In some embodiments, the algorithm assumes that the signal profile, D, of a single substrate feature is known. Since the image Y includes the convolution $D*X_0$ of D with the activation map, $X_0$, to construct Y, $X_0$ is to be estimated. Because the total number of discs is small, the activation map $X_0$ is sparse. $X_0$ is estimated by solving the optimization problem in Equation 5:

$$\hat{X} = \mathrm{argmin}_{X \geq 0} \lambda \sum_{ij=1}^{m} X_{ij} + \frac{1}{2} \|L[D*X] - R\|_2^2$$ (Equation 5)

Here, the first term encourages $\hat{X}$ to be sparse, while the second term encourages it to accurately reproduce the observed line scans. The parameter $\lambda$ balances the relative importance of the two summands. The optimization problem Equation 5 is convex, and hence can be solved globally using efficient methods. A simple solver is applied based on the proximal gradient descent method. In each iteration, the difference between L[D*X] and R is reduced by moving in the negative gradient vector direction. A proximal operator is then applied, which suppresses small entries and restricts X to be positive:

$$X^{(i+\frac{1}{2})} \leftarrow X^{(i)} - tD * P[L[D*X^{(i)}] - R]$$ (gradient descent)

$$X^{(i+1)} \leftarrow \max\left\{X^{(i+\frac{1}{2})} - \lambda t, 0\right\}$$ (proximal operator)

Here, t is a small constant, L is the line integration defined in Equation 6, and P is the back projection operator defined by Equation 7.

$$L[Y](s, t) = \int Y(z\cos s + t\sin s, z\sin s - t\cos s)dz$$ (Equation 6)

$$P[R_{s_1}, \ldots, R_{s_p}](x, y) = \sum_{i=1}^{p} R_{s_i}(x\sin s_i - y\cos s_i)$$ (Equation 7)

In some embodiments, the algorithm can be understood as an iterative back projection method. The overall computational time is dominated by the line scan L and back projection P operations. In practice, it is advisable to start this algorithm with empty activation map $X^{(0)}=0$ and choose the balancing constant $$= \max_{(x,y)} \frac{1}{3} D * P[L[Y]](x, y),$$

which is one third of the largest entry of $$X^{(1+\frac{1}{2})}.$$

By way of example, for scanning resolution to be 50 µm over a scanning area around 3×3 mm², the algorithm often uses a few hundred to a thousand iterations to reach a satisfactory result. This can take around 20-30 minutes with ordinary computational power.

In some embodiments, the image Y is reconstructed by minimizing a Lasso-type loss function which includes the sparsity for the discrete location map $X \in \mathbb{R}^{n \times n}$ and the square norm error between observed line scans R and the line scan of a reconstructed image. Moreover, the best fitting microscope system parameters $p_1, \ldots, p_m \in \mathcal{P}$ are calibrated for line projection $\mathcal{L}$ and point-spread-function y during minimization.

$$\min_{X \geq 0, p \in \mathcal{P}} \sum_{i,j=1}^{n} \lambda_{ij} X_{ij} + \sum_{i=1}^{m} \frac{1}{2} \|S\{\psi * \mathcal{L}_{\theta_i}\{p_i\}[D*X]\} - R_i\|_2^2$$

In some embodiments, the minimization problem is solved multiple times while modifying the penalty variable X in different runs. This "reweighting" method was found to overcome systematic noise and produce better reconstruction results. In some embodiments, an accelerated alternating minimization method for non-smooth, non-convex objective functions is used in each run, e.g., Inertial Proximal Alternating Linearized Minimization (iPalm).

EXAMPLES

Referring again to FIG. 5, continuous line probe (CLP) scans were conducted over a single 250 µm diameter electroactive platinum disk in an electrolyte of 1 mM $H_2SO_4$ in 0.1 M $Na_2SO_4$ at four different scan angles at a scan rate of 10 ums$^{-1}$. The CLP potential was held at 0.7 V vs Ag|AgCl and the substrate was held at a mass transfer limiting potential for the hydrogen evolution reaction at −0.8 V vs Ag|AgCl. As expected, the CLP line scan profiles at each of the four scan angles overlay almost exactly.

Figure 6A:
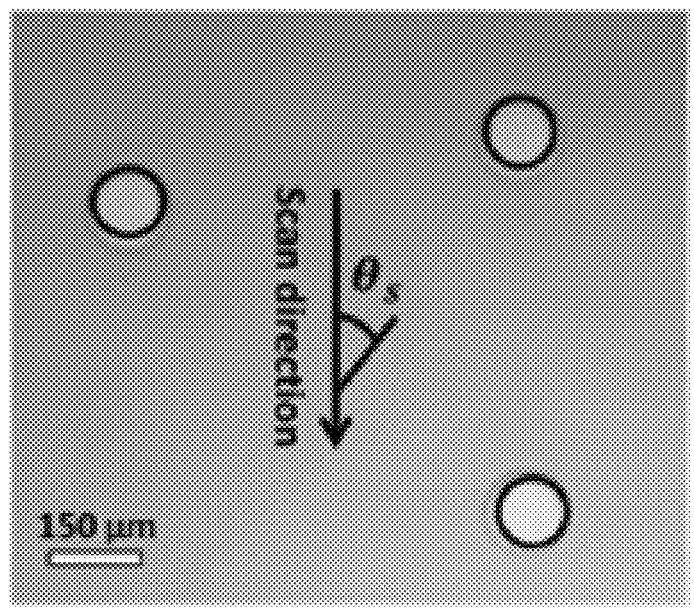
FIG. 6A is an exemplary sample substrate for analysis via scanning electrochemical microscopy according to some embodiments of the present disclosure.
Figure 6B:
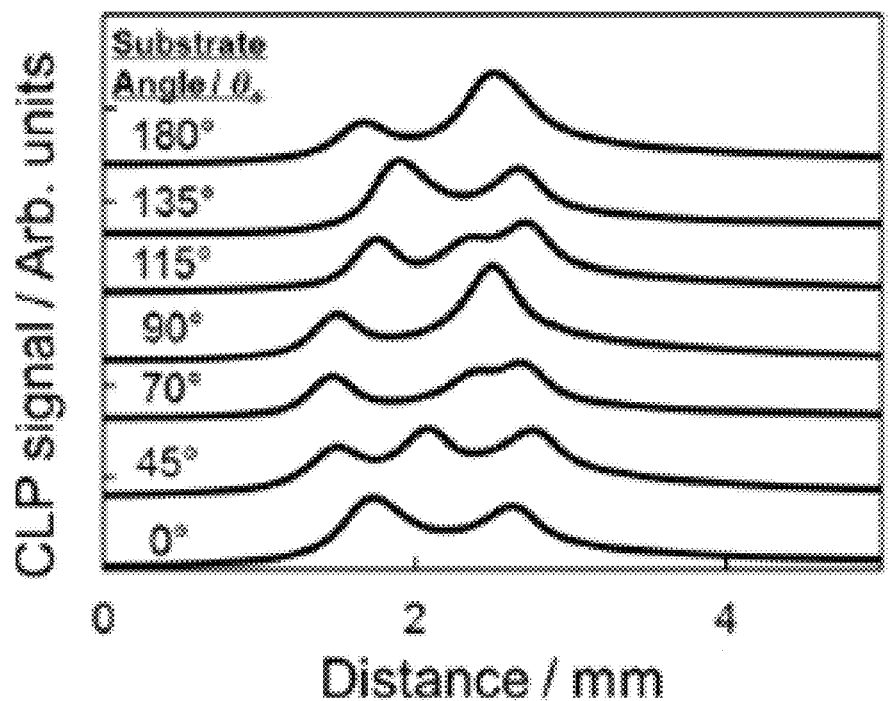
FIG. 6B is a graph of exemplary continuous line probe line scans according to some embodiments of the present disclosure.
Figure 6C:
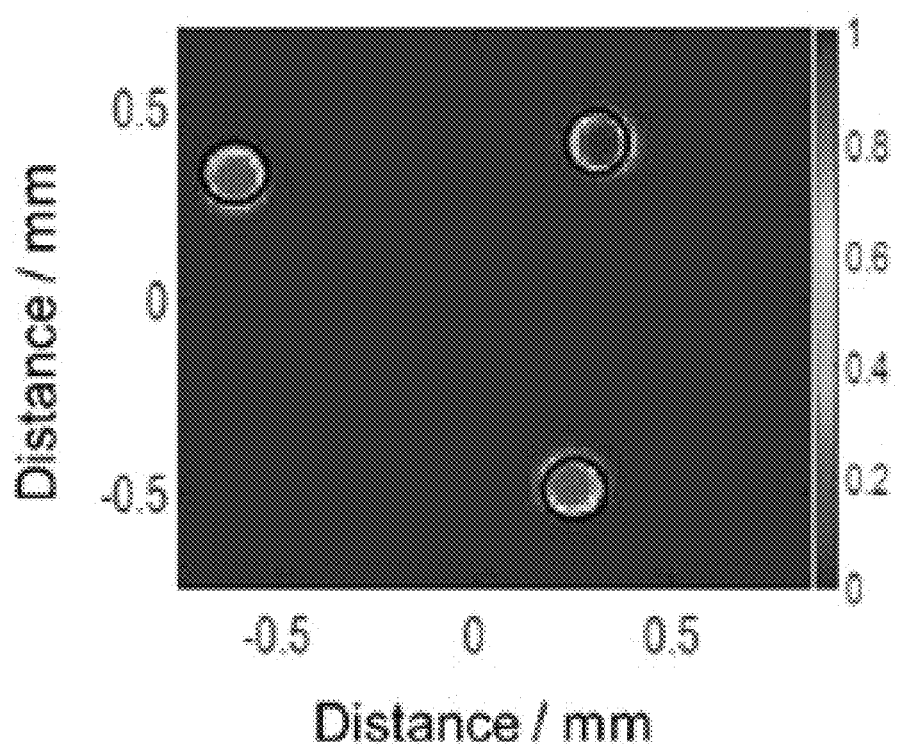
FIG. 6C is an image reconstructed by a system for performing scanning electrochemical microscopy according to some embodiments of the present disclosure.
Figure 7:
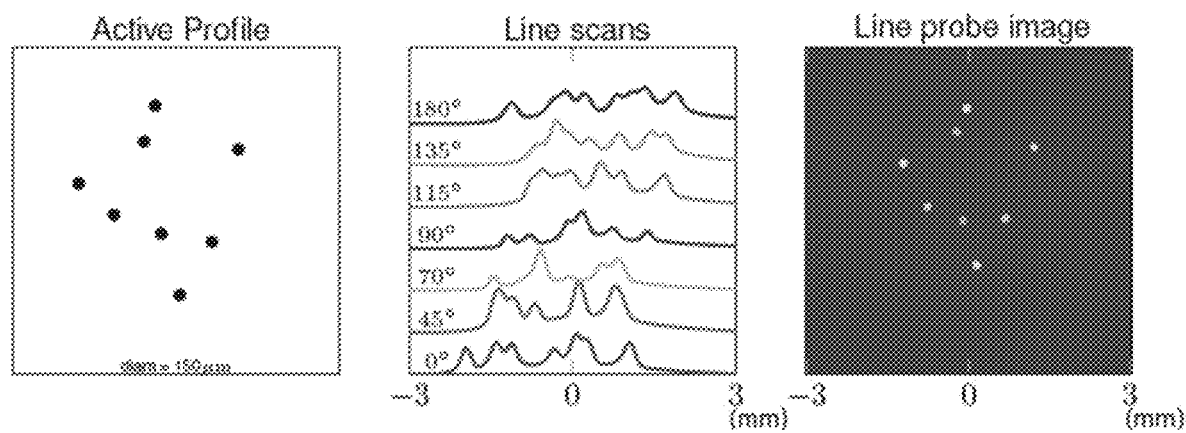
FIG. 7 is a graphical representation of a scanning electrochemical microscopy process according to some embodiments of the present disclosure.
Figure 8:
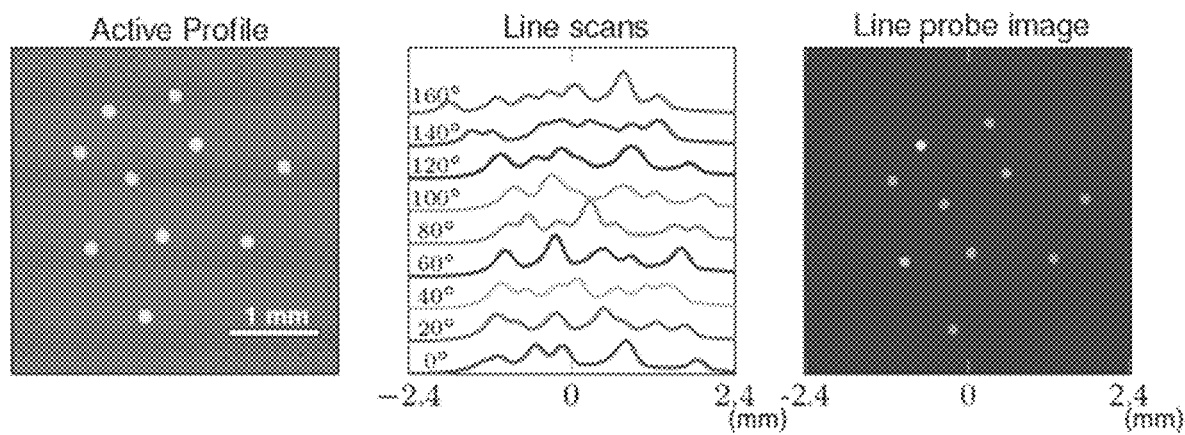
FIG. 8 is a graphical representation of a scanning electrochemical microscopy process according to some embodiments of the present disclosure.

Referring now to FIG. 6A, exemplary CLP-SECM imaging was carried out using a sample containing three electroactive platinum disks with diameters of 150 µm. Seven total CLP line scans were recorded sequentially using the same scan conditions identified above with respect to FIG. 5. The raw line scan signals for each of the scans are shown in FIG. 6B. This data was then fed to a compressed sensing reconstruction algorithm to produce the two-dimensional CLP-SECM image shown in FIG. 6C. The compressed sensing reconstructed image in FIG. 6C accurately displays three circular features having diameters and locations in good agreement with the true locations of the three platinum disks. The CLP-SECM process produced an image of similar quality to that produced via convention SECM processes, but was able to do so in about 10% of the time. Further exemplary CLP-SECM scans and reconstructed images are shown in FIG. 7 (for an 8-feature sample) and FIG. 8 (for a 10-feature sample).

Methods and systems of the present disclosure are advantageous in that they provide scanning electrochemical microscopy and image reconstruction with comparable resolution to traditional processes in a reduced timespan. The microscopy is performed with a system including nonlocal scanning probes which, combined with compressed sensing reconstruction algorithm, can generate those images. The nonlocal scanning probes reduce the complexity of a sample substrate scan and reduce the number of scans necessary to image an entire sample. The compressed sensing reconstruction algorithm then outputs an image with comparable resolution to traditional scans so as to be sufficient for identifying features and characterizing a sample substrate.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A system for performing scanning electrochemical microscopy comprising:
   a continuous line probe including:
      an insulating probe substrate;
      an insulating layer; and
      a conductive band electrode disposed between the insulating probe substrate and the insulating layer; and
   a sample stage positioned to enable contact with the insulating probe substrate;
   wherein the continuous line probe is positioned at an angle $\Theta_{CLP}$ to the sample stage.

2. The system according to claim 1, wherein $\Theta_{CLP}$ is about 45°.

3. The system according to claim 1, wherein the conductive band electrode has a thickness between about 10 μm and about 100 μm.

4. The system according to claim 3, wherein the conductive band electrode has a thickness less than about 50 μm.

5. The system according to claim 1, wherein the insulating probe substrate has a thickness between about 50 μm to about 70 μm.

6. The system according to claim 1, wherein the insulating probe substrate and the conductive band electrode have substantially the same thickness.

7. The system according to claim 1, further comprising an additional point probe.

8. The system according to claim 1, wherein the sample stage includes a rotational module configured to rotate the sample stage about one or more rotational axis and an XYZ module configured to translate the sample stage along one or more planar axis.

9. A method for performing scanning electrochemical microscopy comprising:
   providing a scanning electrochemical microscopy system including:
      a continuous line probe including:
         a conductive band electrode; and
         at least one insulating sheet on the conductive band electrode;
   positioning the continuous line probe at an angle to a substrate to be imaged and at an initial position relative the substrate, wherein the at least one insulating sheet is in contact with the substrate;
   applying an electrical potential to the continuous line probe;
   applying an electrical potential to the substrate;
   translating the continuous line probe across the substrate along an initial axis;
   measuring continuous line probe current during translation along the initial axis;
   repositioning the continuous line probe at a subsequent position relative to the substrate;
   translating the continuous line probe across the substrate along a subsequent axis, wherein the subsequent axis is at an angle to the initial axis;
   measuring continuous line probe current during translation along the subsequent axis; and
   identifying changes in continuous line probe current along the initial axis and subsequent axis indicating the presence of a feature on the substrate.

10. The method according to claim 9, further comprising reconstructing an image of the substrate corresponding to at least the changes in continuous line probe current along the initial axis and subsequent axis via compressed sensing reconstruction.

11. The method according to claim 9, further comprising repeating the following steps one or more times to provide a plurality of subsequent continuous line probe current measurements:
   repositioning the continuous line probe at a subsequent position relative to the substrate;
   translating the continuous line probe across the substrate along a subsequent axis, wherein the subsequent axis is at an angle to the initial axis; and
   measuring continuous line probe current during translation along the subsequent axis.

12. The method according to claim 9, further comprising preconditioning the probe to clear reactant species from and oxidize organic matter on the probe.

13. The method according to claim 9, wherein the average separation distance $d_m$ between the conductive band electrode and the substrate to be imaged is defined by:

$$d_m = \left(\frac{t_E}{2} + t_I\right)\sin(90° - \Theta_{CLP})$$

wherein $t_E$ is the thickness of the conductive band electrode, $t_I$ is the thickness of the at least one insulating sheet, and $\Theta_{CLP}$ is the angle of the continuous line probe to the substrate, wherein $d_m$ is about 50 μm to about 70 μm.

14. The method according to claim 9, further comprising:
   holding the continuous line probe in contact with the substrate prior to translating the continuous line probe across the substrate along the initial axis, wherein the hold has a duration greater than about 3 minutes.

15. A method for performing scanning electrochemical microscopy comprising:
   providing a scanning electrochemical microscopy system including:
      a continuous line probe including:
         an insulating probe substrate;
         an insulating layer; and
         a conductive band electrode disposed between the insulating probe substrate and the insulating layer; and
      a sample stage positioned to enable contact with the insulating probe substrate, the sample stage including a rotational module configured to rotate the sample sage about one or more rotational axis and an XYZ module configured to translate the sample stage along one or more planar axis;

positioning a sample substrate to be imaged on the sample stage;

positioning the continuous line probe at an angle to the sample substrate and at an initial position relative to the sample substrate, wherein the insulating probe substrate is in contact with the sample substrate;

applying an electrical potential to the continuous line probe;

applying an electrical potential to the sample substrate;

translating the continuous line probe across a first portion of the sample substrate along an initial axis;

repositioning the continuous line probe via at least one of the rotational module and the XYZ module at one or more additional positions relative to the sample substrate;

translating the continuous line probe across an additional portion of the sample substrate along one or more additional axis, wherein the one or more additional axis are at an angle to the initial axis;

identifying changes in continuous line probe current along the initial axis and the one or more additional axis indicating the presence of a feature on the sample substrate; and reconstructing an image of the sample substrate corresponding to at least the changes in continuous line probe current along the initial axis and the one or more additional axis via compressed sensing reconstruction.

\* \* \* \* \*